United States Patent [19]

Itoh et al.

[11] Patent Number: 4,669,826

[45] Date of Patent: Jun. 2, 1987

[54] APPARATUS FOR DETECTING THE DIRECTION OF LIGHT FOR DAZZLE-FREE MIRRORS

[75] Inventors: Hiroshi Itoh, Oubu; Shinya Ohmi, Anjo; Yasutoshi Suzuki, Oubu; Tsuyoshi Fukada, Nagoya; Kunihiko Hara, Nukata, all of Japan

[73] Assignee: Nippondenso Co., Ltd., Kariya, Japan

[21] Appl. No.: 701,224

[22] Filed: Feb. 13, 1985

[30] Foreign Application Priority Data

Feb. 16, 1984 [JP] Japan ................... 59-28360

[51] Int. Cl.⁴ ..................... G02F 1/13; G02B 17/00
[52] U.S. Cl. ................... 350/331 R; 358/279; 358/283; 358/338
[58] Field of Search ............ 350/338, 331 R, 278-284

[56] References Cited

U.S. PATENT DOCUMENTS

| 2,444,976 | 7/1948 | Brown . |
| 3,264,267 | 11/1962 | Collins . |
| 3,542,455 | 11/1970 | Jensen . |
| 3,600,060 | 2/1968 | Churchill . |
| 3,601,614 | 8/1971 | Platzer . |
| 3,705,310 | 12/1972 | Wild . |
| 3,787,110 | 1/1974 | Berreman et al. . |
| 3,862,798 | 1/1975 | Hopkins ............... 350/278 |
| 3,869,196 | 3/1975 | Kubota . |
| 3,921,162 | 11/1975 | Fukai et al. . |
| 3,932,026 | 1/1976 | Spokel . |
| 3,944,331 | 3/1976 | Janning . |
| 3,961,181 | 6/1976 | Golden . |
| 3,976,875 | 8/1976 | Engstrom et al. . |
| 3,986,022 | 10/1976 | Hyatt . |
| 4,029,393 | 6/1977 | Dungan et al. . |
| 4,040,727 | 8/1977 | Ketchpel . |
| 4,095,217 | 6/1978 | Tani et al. . |
| 4,161,653 | 7/1979 | Bedini et al. . |
| 4,200,361 | 4/1980 | Malvano . |
| 4,201,451 | 3/1980 | Jacob . |
| 4,202,607 | 5/1980 | Washizuka et al. . |
| 4,229,077 | 10/1980 | Schwab . |
| 4,266,859 | 5/1981 | Togashi . |
| 4,279,474 | 7/1981 | Belgorod . |
| 4,342,030 | 7/1982 | Shanks . |
| 4,390,874 | 6/1983 | Woodside . |
| 4,408,837 | 10/1983 | Kozaki et al. . |
| 4,491,390 | 1/1985 | Tong-Shen . |
| 4,529,278 | 7/1985 | Nugget . |
| 4,530,571 | 7/1985 | Conner . |

FOREIGN PATENT DOCUMENTS

| 0111907 | 6/1984 | European Pat. Off. . |
| 2416172 | 10/1976 | Fed. Rep. of Germany . |
| 2604462 | 8/1977 | Fed. Rep. of Germany . |
| 2732727 | 3/1978 | Fed. Rep. of Germany . |
| 2808260 | 8/1979 | Fed. Rep. of Germany . |
| 2111683 | 6/1972 | France . |
| 0040348 | 3/1977 | Japan . |
| 0039845 | 3/1980 | Japan . |
| 0004003 | 1/1982 | Japan . |
| 0102603 | 6/1982 | Japan . |
| 490516 | 10/1937 | United Kingdom . |
| 2029343 | 3/1980 | United Kingdom . |

Primary Examiner—John K. Corbin
Assistant Examiner—David Lewis
Attorney, Agent, or Firm—Cushman, Darby & Cushman

[57] ABSTRACT

In a vehicle having an interior room mirror and a pair of exterior right and left side mirrors, a single photo sensor is provided for detecting an intensity of light incident from the rear of the vehicle. A driving circuit drives both the room mirror and the side mirrors into a dazzle-free condition in common when the photo diode detects the intensive rear light. Alternatively two photo sensors are provided for detecting not only the intensity of the rear light but also direction of the rear light and both the room mirror and one of the right and left side mirrors are driven into the dazzle-free condition in accordance with both the intensity and direction of the rear light.

4 Claims, 6 Drawing Figures

APPARATUS FOR DETECTING THE DIRECTION OF LIGHT FOR DAZZLE-FREE MIRRORS

RELATED APPLICATIONS

The subject matter of this application is related in general to the subject matter of the following applications: Itoh et al, Ser. No. 616,185, filed June 1, 1984, Itoh et al, Ser. No. 670,015, filed Nov. 9, 1984, Ohmi et al, Ser. No. 671,612, filed Nov. 15, 1984, and Ito et al, Ser. No. 593,946, filed Mar. 27, 1984. These cases all relate in general to dazzle-free mirrors.

BACKGROUND OF THE INVENTION

The present invention relates to a driving apparatus for dazzle-free reflection mirrors of a vehicle which automatically drives the reflection mirrors into a dazzle-free condition by detecting an intensity of light incident from the rear of the vehicle.

Known heretofore is an apparatus which detects light incident from the rear of a vehicle to an interior room mirror by a rear light sensor mounted on the room mirror and drives the room mirror into a dazzle-free condition.

Known also is an apparatus which detects light incident from the rear of the vehicle to an exterior side mirror by a rear light sensor mounted on the side mirror and drives the side mirror into a dazzle-free condition.

Provided that both the above-described mirrors mounted on the vehicle should be driven into the dazzle-free condition, it is considered necessary to provide respective rear light sensors and driving circuits which independently detect the intensity of light to perform dazzle-free operations. This is not advantageous either in cost or in space.

SUMMARY OF THE INVENTION

It is an object of the present invention to provide a driving apparatus for dazzle-free reflection mirrors of a vehicle which, based on the finding that there is no substantial difference between the directions in detecting light incident from the rear of the vehicle for performing dazzle-free operations of an interior room mirror and an exterior side mirror, uses a single rear light detecting sensor in common for performing the dazzle-free operations of both the room mirror and side mirror and is hence advantageous in cost and in space.

According to the present invention, single rear light detecting means for detecting an intensity of light incident from the rear of a vehicle and driving means for driving an exterior side mirror and an interior room mirror in common into respective dazzle-free conditions in accordance with the intensity of the rear light detected by the rear light detecting means are provided.

DETAILED DESCRIPTION OF THE PREFERRED EMBODIMENTS

The present invention is described hereinunder with reference to the embodiments shown in the accompanying drawings.

Figure 1:
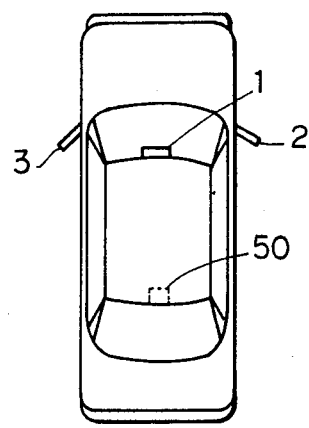
FIG. 1 is a schematic view showing a positional relation between a room mirror and side mirrors.
Figure 2:
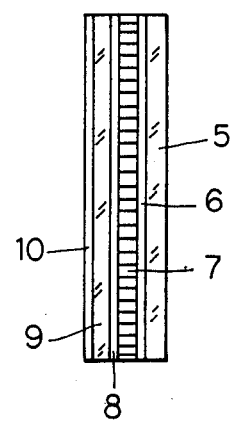
FIG. 2 is a sectional view showing structure of a reflection mirror.
Figure 3:
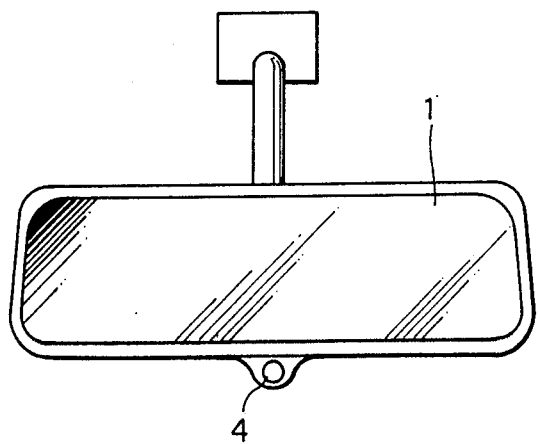
FIG. 3 is a plan view showing mounted condition of a photo diode on a room mirror.

As shown in FIG. 1, an interior room mirror 1 and exterior side mirrors 2 and 3 are mounted on the respective interior and exterior portions of a vehicle as reflection mirrors. One of the side mirrors 2 and 3 may be eliminated. Each reflection mirror is structured as shown in FIG. 2. The reflection mirror shown in FIG. 2 comprises, from the right to left in the Figure, a transparent glass substrate 5 facing a driver's seat or the rear of the vehicle, a transparent electrode layer 6 consisting of ITO, a liquid crystal layer 7, a transparent electrode layer 8, a transparent glass substrate 9 and a reflection layer 10 such as chrome film. The liquid crystal layer 7 is either transparent or non-transparent depending on whether there is no electric voltage or a certain electric voltage applied between the electrode layers 6 and 8, respectively, so that the reflection mirror is kept in a normal condition and in a dazzle-free condition. Further, as shown in FIG. 3, a photo diode 4 is provided at a bottom portion of the room mirror 1 to detect an intensity of light incident from the rear of the vehicle.

Figure 4:
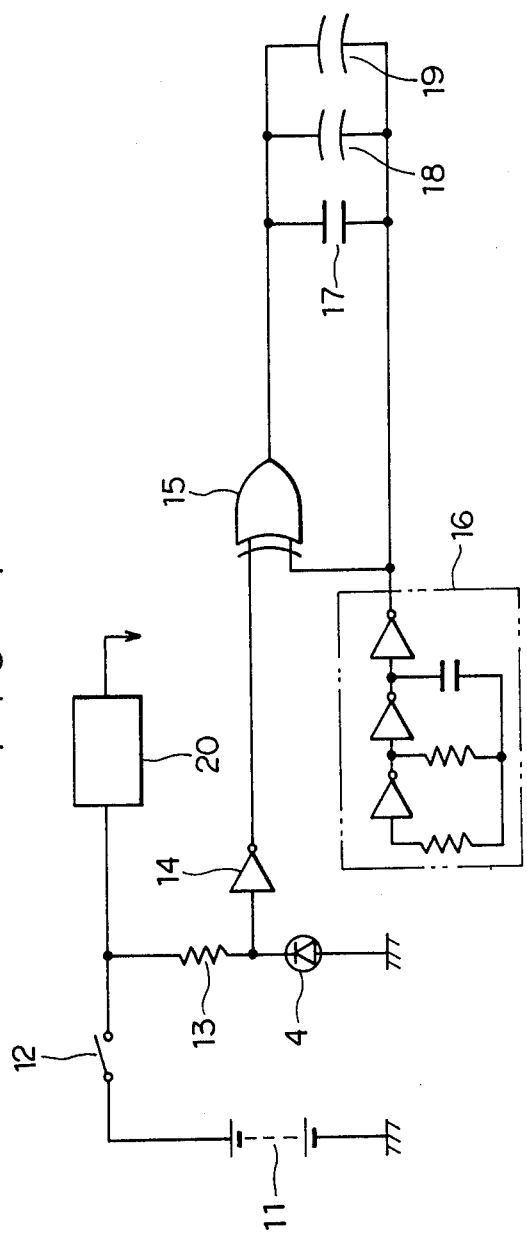
FIG. 4 is an electric wiring diagram showing a first embodiment of the present invention.

In FIG. 4 showing an electric wiring diagram of a circuit which drives the room mirror 1 and the side mirrors 2 and 3 into a dazzle-free condition, numeral 11 denotes a battery mounted on the vehicle, 12 a light switch which activates head lamps (not shown), 13 and 14 a resistor and an inverter which are connected to the photo diode 4 and co-operatively detect the intensity of light incident from the rear of the vehicle in excess of a predetermined level, 15 an exclusive-OR circuit which receives an output signal of the inverter 14 at one input thereof, 16 an oscillator circuit which produces an oscillation signal at a fixed frequency, 17, 18 and 19 liquid crystal elements each having the liquid crystal layer and the transparent electrodes provided on both sides thereof in the room mirror 1 and the side mirrors 2 and 3, and 20 a constant voltage circuit which supplies logic elements of the above-described circuits with a constant voltage.

Operation of the above-described embodiment is described next.

Assuming first that the light switch 12 is not turned on because of driving the vehicle in the daytime, no battery voltage is supplied from the battery 11 to the circuits and the liquid crystal elements 17, 18 and 19 remain transparent. The room mirror 1 and the side mirrors 2 and 3 remain in their normal condition, therefore, reflect substantially all of the light incident from the rear of the vehicle to assure good rear view visibility thereon.

Assuming next that the light switch 12 is turned on to activate the head lamps because vehicle is being driven at night, a battery voltage is supplied from the battery to the circuits.

Provided that the light incident from the rear of the vehicle is not intensive under this condition, a voltage at the connection between the photo diode 4 and the resistor 13 becomes high and the output signal of the inverter 14 becomes low. With this low level signal being applied to the input of the exclusive-OR circuit 15, the exclusive-OR circuit 15 produces an oscillation signal in the same phase as the oscillation signal applied from the oscillator circuit 16 to the other input thereof. Under this condition, each of the liquid crystal elements 17, 18 and 19 is applied at both sides thereof with the oscillation signals in the same phase and no voltage is applied across the liquid crystal layer so that the liquid crystal layer keeps transparency. The room mirror 1 and the side mirrors 2 and 3, as a result, reflect whole light incident from the rear of the vehicle to assure good rear view visibility thereon.

On the other hand, provided that the light from the rear of the vehicle is intensive because of the head light from the following vehicle, the voltage at the connection between the photo diode 4 and the resistor 13 decreases to a low level and the output signal of the inverter 14 becomes high.

With this high level signal being applied to the exclusive-OR circuit 15, the exclusive-OR circuit 15 produces an oscillation signal which is in opposite phase to the oscillation signal applied from the oscillator circuit 16 to the other input thereof. Under this condition, each of the liquid crystal elements 17, 18 and 19 is applied at both sides thereof with the oscillation signal in the opposite phase and an alternative current voltage is applied resultantly across the liquid crystal layer so that the liquid crystal layer becomes nontransparent. The room mirror 1 and the side mirrors 2 and 3 are driven into the dazzle-free condition to prevent dazzling of the light from the rear of the vehicle.

It would be understood in the above-described embodiment that, since the photo diode 4 is provided at the bottom of the room mirror 1, only the light from the rear of the vehicle is detected without being influenced by brightness around the vehicle so that the dazzle-free operation of the room mirror 1 and the side mirrors 2 and 3 is assured.

Although all the room mirror 1 and the side mirrors 2 and 3 are driven in common into the dazzle-free condition independently of the direction in which the light from the rear of the vehicle is incident in the above-described embodiment, it may be modified such that the room mirror 1 and the side mirrors 2 and 3 are selectively driven into the dazzle-free condition in accordance with the direction in which the light from the rear of the vehicle is incident. This modified embodiment is described next.

Figure 5:
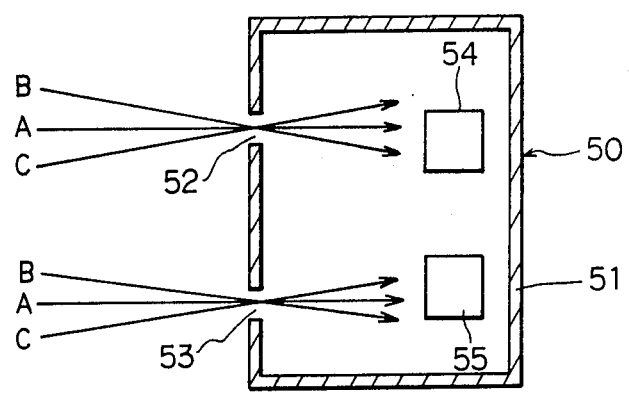
FIG. 5 is a sectional view showing structure of a rear light detector used in a second embodiment of the present invention.

In this second embodiment, a rear light detector 50 shown in FIG. 5 is provided at the rear of a vehicle compartment ceiling (at the portion indicated by a dotted line in FIG. 1) for detecting the rear light. In the rear light detector 50, two photo diodes 54 and 55 are arranged horizontally within a light-shielding housing 51 having two slits 52 and 53 facing the rear of the vehicle. The photo diodes 54 and 55 are positioned behind the slits 52 and 53, respectively, and biased a little closer to the center. With this positional relation between the two slits 52 and 53 and the two diodes 54 and 55, light A incident from right behind the vehicle, light B incident from the rear left of the vehicle and light C incident from the rear right of the vehicle are detected by the two photo diodes 54 and 55, only by the photo diode 54 and only by the photo diode 55, respectively.

Figure 6:
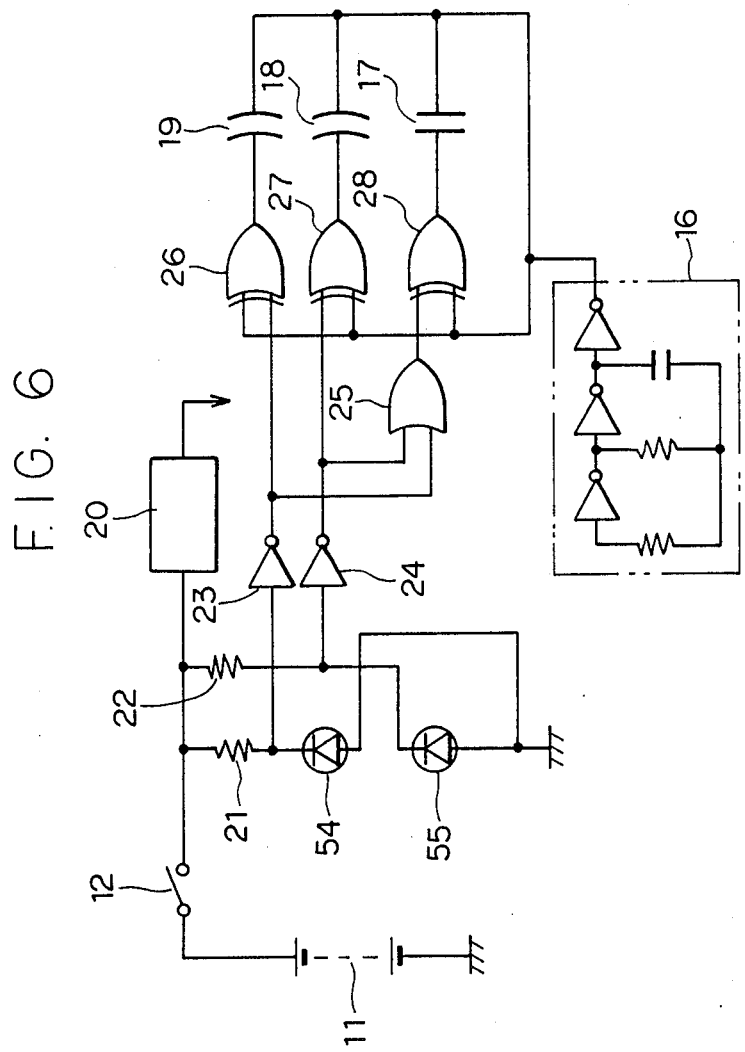
FIG. 6 is an electric wiring diagram showing a second embodiment of the present invention.

Detailed circuit of this embodiment is shown in FIG. 6. Same reference numerals are used in FIG. 6 to denote the same parts as in the first embodiment shown in FIG. 4. It is different from the first embodiment in FIG. 4 in that the photo diodes 54 and 55, resistors 21 and 22, inverters 23 and 24 and an OR circuit 25 which receives output signals of the inverters 23 and 24 as inputs thereof are provided in place of the photo diode 4, the resistor 13 and the inverter 14 in FIG. 4 and in that three exclusive-OR circuits 26, 27 and 28 which receive output signals of the inverters 23 and 24 and the OR circuit 25 as one inputs, respectively, are provided in place of the exclusive-OR circuit 15 in FIG. 4. The three exclusive-OR circuits 26, 27 and 28 are applied with the oscillation signal of the oscillator circuit 16 at the other inputs thereof, respectively.

Operation of the above-described embodiment is described next.

Assuming first that the light switch 12 is not turned on because of driving the vehicle in the daytime, no battery voltage is supplied from the battery 11 to the circuits and none of the room mirror 1 nor the side mirrors 2 and 3 is driven into the dazzle-free condition.

Assuming next that the light switch 12 is turned on because of driving the vehicle at night, the battery voltage is supplied from the battery 11 to the circuits.

Provided that the light incident from the rear of the vehicle is not intensive under this condition, both voltages at the connections between the photo diode 54 and the resistor 21 and between the photo diode 55 and the resistor 22 become high and the inverters 23 and 24 produce respective low level signals. The output signal of the OR circuit 25, therefore, becomes low. With all the output signals of the inverters 23 and 24 and the OR circuit 25 being low levels, the exclusive-OR circuits 26, 27 and 28 produce oscillation signals which are in the same phase as the oscillation signal from the oscillator circuit 16. Since each of the liquid crystal elements 17, 18 and 19 is applied at both side thereof with the oscillation signals in the same phase, the liquid crystal layer keeps transparency and none of the room mirror 1 nor the side mirrors 2 and 3 is driven into the dazzle-free condition.

On the other hand, provided that light A such as head lamp light of the following vehicle is incident from right behind the vehicle or, stated in other words, is incident from the center of the rear of the vehicle, it is detected by the photo diodes 54 and 55 through the slits 52 and 53. Both the voltages at the connections between the photo diode 54 and the resistor 21 and between the photo diode 55 and the resistor 22 become low and the inverters 23 and 24 produce the respective high level signals. The output signal of the OR circuit 25 also becomes high. With all the output signals of the inverters 23 and 24 and the OR circuit 25 being high levels, the exclusive-OR circuits 26, 27 and 28 produce respective oscillation signals in opposite phase to the oscillation signal from the oscillator circuit 16. Each liquid crystals of the liquid crystal elements 17, 18 and 19, as a result, is applied with the alternating voltage to become nontransparent. Thus, the room mirror 1 and the side mirrors 2 and 3 are driven into the dazzle-free condition so that dazzling of the light A incident from right behind the vehicle is prevented.

Provided further that light B such as head lamp light is incident from the rear left of the vehicle, it is detected only by the photo diode 54 through the slit 52. Under this condition, the voltage at the connection between the photo diode 54 and the resistor 21 becomes low and the output signals of the inverter 23 and the OR circuit 25 become high so that the liquid crystal layers of the liquid crystal elements 17 and 18 become nontransparent. The room mirror 1 and the side mirror 3 mounted on the left side of the vehicle are driven into the dazzle-free condition so that dazzling of the light B incident from the rear left of the vehicle is prevented.

Provided still further that light C such as head lamp light is incident from the rear right of the vehicle, it is detected only by the photo diode 55 through the slit 53. Under this condition, the voltage at the connection between the photo diode 55 and the resistor 22 becomes low and the output signals of the inverter 24 and the OR circuit 25 become high so that the liquid crystal layers of the liquid crystal elements 17 and 18 become nontransparent. The room mirror 1 and the side mirror 2 mounted on the right side of the vehicle are driven into the dazzle-free condition so that dazzling of the light incident from the rear right of the vehicle is prevented.

It should be noted in the above-described embodiment that, although the direction in which the light from the rear of the vehicle is incident is discriminated by way of the positional relation between the slits 52 and 53 and the photo diodes 54 and 55, it may be done by providing the photo diodes 54 and 55 with lenses having focuses in place of the slits 52 and 53. The direction of light may be detected alternatively by an image sensor.

It should be noted further in both the above-described embodiments that, although the circuitry for preventing dazzling is made operative upon turning on of the light switch 12, it may be made operative when it is detected by means for detecting brightness around the vehicle that it is dark at the vehicle exterior.

It should be noted further that, although a liquid crystal is used for preventing dazzling, other materials such as an electrochromic may be used as long as they change transparency upon application of a voltage. Alternatively, the room mirror and the side mirror may be switched to the dazzle-free condition electromagnetically (mechanically) without using such materials.

It should be noted further that, although the liquid crystal layer is switched between the transparent and nontransparent conditions, the transparency may be changed continuously between the transparent and nontransparent conditions in accordance with the light incident from the rear of the vehicle.

It should be noted further that driving circuits may be provided for the side mirrors and the room mirror separately so that a single photo diode for detecting the rear light is used in common by the respective driving circuits.

What we claim is:

1. An apparatus for driving an interior room mirror and a pair of exterior right and left side mirrors of a vehicle comprising:
   rear light detecting means for detecting an intensity and for detecting whether the direction of light incident generally from the rear of the vehicle is incident from the right, left or center of said vehicle; and
   driving means for driving both said interior room mirror and one of said exterior right and left side mirrors substantially simultaneously into dazzle-free operation in accordance with the intensity and direction of the rear light detected by said rear light detecting means.

2. An apparatus according to claim 1, wherein said rear light detecting means includes a pair of photo sensors one of which is arranged to detect light incident from only directly behind and rear right of the vehicle and the other of which is arranged to detect light incident from only directly behind and rear left of the vehicle.

3. An apparatus according to claim 2, wherein said rear light detecting means comprises a casing provided with a pair of slits facing the rear of the vehicle and encasing said photo sensors therein.

4. An apparatus according to claim 3, wherein said photo sensors are positioned behind said slits respectively, and toward a point central between said slits.

* * * * *